UNITED STATES PATENT OFFICE.

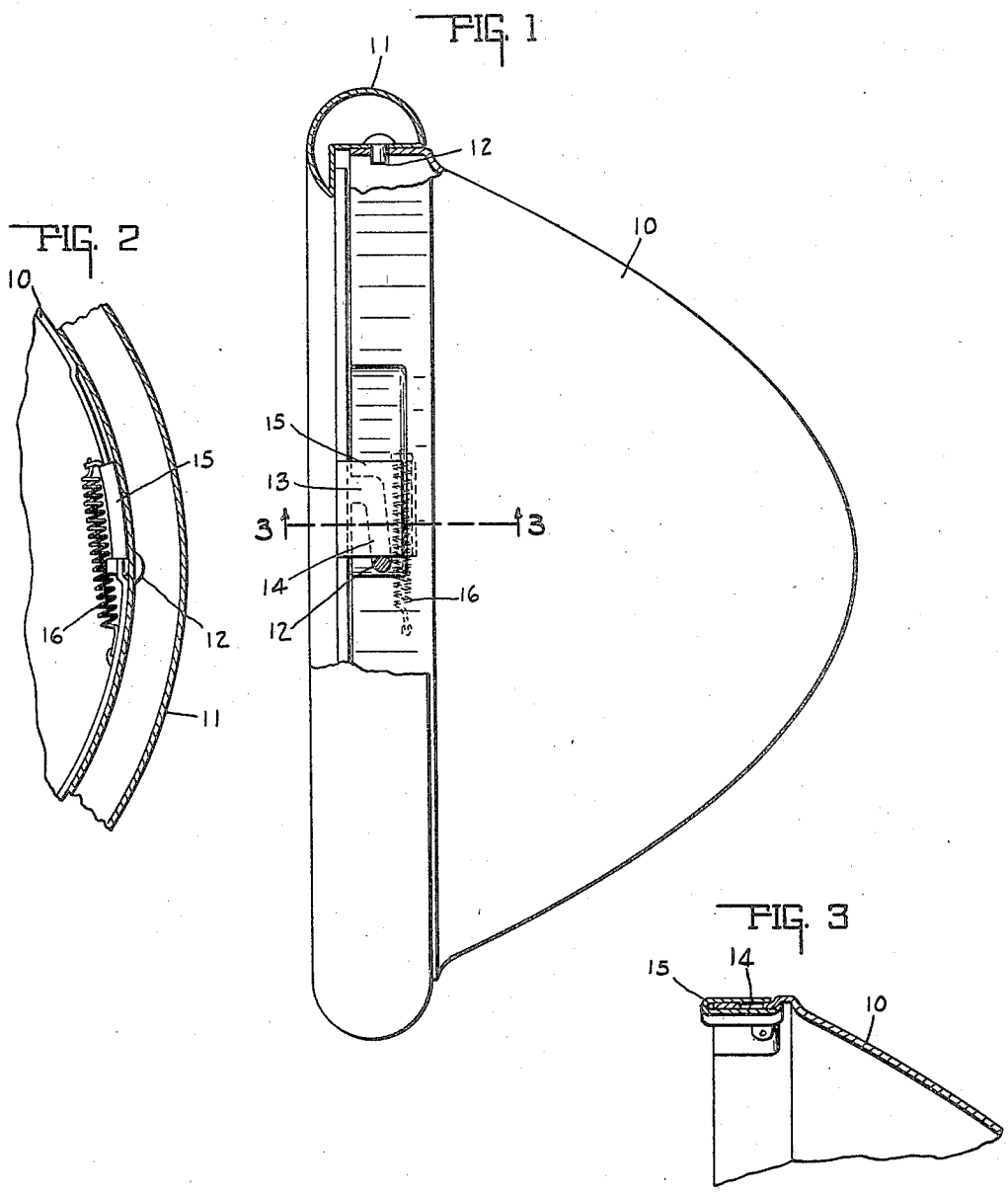

HARRY C. FOSTER AND WILLIAM F. THOMS, OF CONNERSVILLE, INDIANA, ASSIGNORS TO INDIANA LAMP COMPANY, A CORPORATION OF INDIANA.

FASTENING MEANS FOR LAMP-LENSES.

1,390,029.  Specification of Letters Patent.  Patented Sept. 6, 1921.

Application filed October 11, 1919. Serial No. 329,955.

*To all whom it may concern:*

Be it known that we, HARRY C. FOSTER and WILLIAM F. THOMS, citizens of the United States, and residents of Connersville, county of Fayette, and State of Indiana, have invented a certain new and useful Fastening Means for Lamp-Lenses; and we do hereby declare that the following is a full, clear, and exact description thereof, reference being had to the accompanying drawings, in which like numerals refer to like parts.

This invention relates to the door construction of a lamp of that type generally used as a headlight or tail light for motor vehicles, but may be equally well applied for any other similar type of lamp construction. The particular feature of the invention relates to a means for securing the door rim upon the lamp casing.

The main feature of the invention consists in a yielding means for normally retaining the rim in locked position, said means adapted to be overcome by the manual operation of turning the rim to unlocking position.

The full nature of this invention will be understood from the accompanying drawings and the following description and claims.

In the drawings Figure 1 is a side elevation of a lamp with a section thereof removed. Fig. 2 is a front elevation of a portion of the lamp with the door rim removed therefrom. Fig. 3 is a cross section taken on the line 3—3 of Fig. 1.

In the drawings there is shown a lamp having a casing 10 with an outwardly extending peripheral flange about its forward opening, upon which is mounted a lens rim 11 adapted to seat on said flange. The lens rim 11 is provided with a plurality of inwardly and radially projecting lugs 12 arranged in such a position as to pass through the opening 13 of the elongated slots 14 in said flange, said lugs entering said slots as the lens rim is turned upon the casing so as to lock it in position and prevent its direct removal therefrom.

To yieldingly retain said lugs in engaging position within said slots and secure the lens rim in place, there is provided a sliding member 15 which is yieldingly held in closed position over one of the slots 14 by a spring 16, which is secured at one end to said member, and at the other end to the inner surface of the casing. The sliding member 15 is adapted to embrace and slide upon the flanged portion of the casing so that upon mounting the lens rim one of the lugs 12 will engage the end of said member, and as the rim is rotated to a position wherein the lugs will enter the opening 13 it will cause said member to uncover the slot 14 and opening 13 against the tension of the spring 16, and upon the lugs entering the openings will cause the rim to be turned to locking position. The spring 16 will then retain said sliding member against one of said lugs and prevent the rim from being turned to unlocking position, except against the tension of said spring, wherein said rim will normally be retained in locking position excepting when manually operated so as to cause the tension on the sliding member to be overcome.

The invention claimed is:

1. A fastening means for the lens rim of a lamp, including a casing having a slot therein with an opening at one end thereof, a rim adapted to fit on said casing, a lug mounted on said rim in position to enter said opening and pass into said slot when the rim is turned in locking position, a sliding member mounted on said casing so as to normally close said opening, and in position to engage said projection, and yielding means to cause said member to normally hold said projection in said slot and permit its removal therefrom.

2. A fastening means for the lens rim of a lamp, including a casing member and a rim member adapted to fit thereon, one of said members being provided with a slot having an opening at one end and the other member being provided with a lug adapted to enter said opening and slot, a sliding member mounted in connection with said slot for normally closing said opening, whereby said lug will be prevented from leaving said slot and said members will be locked together, and yielding means for causing said sliding member to be maintained normally in its closing position, permitting it to be forced therefrom by the forced movement of said lug, whereby said lug may be removed through said opening and said members disengaged.

3. A fastening means for the lens rim of a lamp including a casing having an elongated passage therein with an opening at one end thereof, a lens rim adapted to fit on said casing, a lug extending radially inwardly from said lens rim in position to enter said opening and pass into said passage when the rim is turned in locking position, a sliding member on said casing adapted to engage said projection, and a spring secured at one end to said member and the other end to said casing in position to yieldingly force said member against said projection for normally retaining it in locking position and permitting it to be moved to unlocking position.

In witness whereof, we have hereunto affixed our signatures.

HARRY C. FOSTER.
WILLIAM F. THOMS.